(12) United States Patent
Disser

(10) Patent No.: US 8,425,141 B2
(45) Date of Patent: Apr. 23, 2013

(54) CONNECTING ARRANGEMENT AND JOINTED SHAFT COMPRISING THE SAME

(75) Inventor: Claus Disser, Seligenstadt (DE)

(73) Assignees: Shaft-Form-Engineering GmbH, Muehlheim (DE); BF New Technologies GmbH, Muehlheim (DE)

( * ) Notice: Subject to any disclaimer, the term of this patent is extended or adjusted under 35 U.S.C. 154(b) by 509 days.

(21) Appl. No.: 12/640,925

(22) Filed: Dec. 17, 2009

(65) Prior Publication Data

US 2010/0143075 A1 Jun. 10, 2010

Related U.S. Application Data

(63) Continuation of application No. PCT/DE2008/000981, filed on Jun. 17, 2008.

(30) Foreign Application Priority Data

Jun. 18, 2007 (DE) .................. 10 2007 028 437
Mar. 6, 2008 (DE) .................. 10 2008 013 042

(51) Int. Cl.
*B25G 3/28* (2006.01)

(52) U.S. Cl.
USPC .................. 403/359.5; 403/359.1

(58) Field of Classification Search .............. 403/315, 403/319, 354.4–354.6, 359.4, 359.5, 359.6, 403/359.1; 464/145, 182, 906; 411/353, 411/517

See application file for complete search history.

(56) References Cited

U.S. PATENT DOCUMENTS

| | | | | |
|---|---|---|---|---|
| 1,512,020 A | * | 10/1924 | Graham | 384/561 |
| 3,262,530 A | * | 7/1966 | Heinz | 192/84.94 |
| 3,446,522 A | * | 5/1969 | Hoard | 384/621 |
| 4,565,458 A | * | 1/1986 | Achee et al. | 384/561 |
| 5,499,884 A | * | 3/1996 | Kuhnhold et al. | 403/359.5 |
| 5,665,001 A | * | 9/1997 | Jacob et al. | 464/182 |
| 6,062,611 A | * | 5/2000 | Percebois et al. | 285/374 |
| 6,715,926 B2 | * | 4/2004 | Tajima et al. | 384/544 |
| 6,780,114 B2 | * | 8/2004 | Sahashi et al. | 464/146 |
| 6,902,325 B1 | * | 6/2005 | Uchman | 384/544 |
| 7,090,061 B2 | * | 8/2006 | Bove et al. | 192/70.2 |
| 7,104,893 B2 | * | 9/2006 | Ouchi et al. | 464/178 |
| 7,112,905 B2 | * | 9/2006 | Chang et al. | 310/112 |
| 7,614,818 B2 | * | 11/2009 | Gutierrez et al. | 403/359.5 |
| 2010/0119301 A1 | * | 5/2010 | Langer et al. | 403/359.5 |

FOREIGN PATENT DOCUMENTS

WO    WO 2008148373 A1 * 12/2008

* cited by examiner

*Primary Examiner* — Michael P Ferguson
*Assistant Examiner* — Nahid Amiri
(74) *Attorney, Agent, or Firm* — Crowell & Moring LLP

(57) ABSTRACT

A connecting arrangement for connecting, for example, two components of a jointed shaft via a securing ring, and a jointed shaft including a connecting arrangement of this type.

2 Claims, 2 Drawing Sheets

CONNECTING ARRANGEMENT AND JOINTED SHAFT COMPRISING THE SAME

CROSS REFERENCE TO RELATED APPLICATIONS

This application is a continuation of international patent application no. PCT/DE2008/000981, filed Jun. 17, 2008, designating the United States of America and published in German on Dec. 24, 2008 as WO 2008/154899, the entire disclosure of which is incorporated herein by reference. Priority is claimed based on Federal Republic of Germany patent application nos. DE 10 2007 028 437.5, filed Jun. 18, 2007, and DE 10 2008 013 042.7, filed Mar. 6, 2008, the disclosures of which are also incorporated herein by reference in their entireties.

BACKGROUND OF THE INVENTION

The invention relates to a connecting arrangement for connecting jointed shafts with a securing ring. The invention also relates to a jointed shaft with a connecting arrangement of this type.

U.S. Pat. No. 4,869,556 (=DE 37 26 135) discloses a drive shaft for a motor vehicle, said drive shaft being connected, for example, with a journal to a gearbox. The shaft is provided, on the side facing toward the gearbox, with a joint, the internal drive hub of which is configured as a profiled sleeve into which a journal of the jointed shaft is inserted. With this known jointed shaft, the journal of the jointed shaft is secured against axial displacement by a securing ring in the sleeve and is sealed with a sealing ring. The sealing ring is arranged displaced further into the sleeve in the direction of insertion of the journal in the sleeve than the securing ring, which is provided at an outer edge region of the sleeve. This makes the securing ring readily accessible for assembly and disassembly.

Securing rings are known in various forms for axially connecting shafts and sleeves. For example, retaining rings with a circular profile in cross-section and securing rings with a rectangular profile in cross-section are sold by Seeger-Orbis GmbH & Co. OHG, and these can be introduced into mutually opposing grooves of the shaft and the sleeve. The securing rings with a rectangular profile are provided for non-releasable connection of, for example, a shaft to a sleeve, wherein, on disassembly, either the ring is sheared off or one of the grooves into which the ring is introduced is destroyed. By contrast with this, the retaining rings with the round profile enable destruction-free release of the connection when, on axial movement of the components connected to one another, the edge of a groove meets the rounded surface of the retaining ring and radially widens or compresses said ring so that the ring is essentially fully accommodated in one of the grooves.

Since the exact position of the releasable retaining rings within the grooves cannot be definitively specified, difficulties can arise when these connections are released. The forces that need to be applied to release the connection can vary or the ring can be forced into a position in which the connection cannot be released without destruction.

In some fields of use, however, there is a need for an axial connection for components which are able to withstand a defined axial load and are easily releasable if a pre-determined load is exceeded.

SUMMARY OF THE INVENTION

It is an object of the invention to provide an improved connecting arrangement of the aforementioned type.

Another object of the invention is to provide a connecting arrangement which utilizes a securing ring.

A further object of the invention is to provide a connecting arrangement which enables a more reliable connection of two components and pre-defined non-destructive disassembly.

These and other objects have been achieved in accordance with the present invention by providing a connecting arrangement comprising a first component and a second component which is connectable to the first component, in which the components are fixable relative to one another, particularly by a securing ring; the securing ring is made from an elastic material, particularly spring steel, and is provided with, for example, a radially extending slit; and the securing ring has a profile with a substantially rectangular cross-section, one edge of which is provided with a defined bevel for facilitating assembly and/or disassembly of the securing ring.

According to one preferred embodiment of the invention, at least one edge of the profile is provided with a defined bevel for facilitating assembly and/or disassembly of the securing ring. The invention is based on the concept that, upon axial movement of the components connected to one another by the securing ring, a bevel of this type on an edge of the profile of the securing ring comes into contact with an edge or the like of a groove, so that the securing ring can be forced radially inwardly or outwardly in defined manner. This minimizes the risk that the securing ring may be displaced in uncontrolled manner into a position in which the connection is no longer non-destructively releasable.

Preferably, the at least one defined bevel is provided on one of the two radially outer edges of the securing ring. As a result, at least one defined assembly or disassembly of the securing ring is possible. However, it is particularly preferable if defined bevels are provided on both the radially outer edges of the securing ring so that both assembly and disassembly of the securing ring with defined forces is enabled.

For many applications, it has proved to be particularly advantageous if the at least one defined bevel is inclined at an angle of between approximately 15° and approximately 35° relative to a radial side surface of the securing ring. An inclination angle of this type enables axial forces of, for example, approximately one ton to be transmitted via the securing ring without the connection being released. However, at a defined high force, the securing ring is forced specifically into one of the grooves of the components connected to one another, so that the connection can be non-destructively released.

The inclination angles of the bevels may be essentially identical. However, in some applications it has proved advantageous if the two bevels are inclined at different angles relative to a radial side face of the securing ring.

In order to connect two components, securing rings are often pre-assembled on one of the components, i.e., introduced into a suitable groove, and the two components are then pushed into one another, expanding or compressing the securing ring. If the securing ring is pre-assembled on a shaft in the unloaded condition, the securing ring assumes an expanded position and therefore lies loosely in the groove of the shaft. As a result, the securing ring can be sheared off or damaged when the shaft is pushed into a sleeve.

According to the invention, this can be prevented by utilizing a securing ring that has a non-round form as viewed in an axial direction, preferably having mirror symmetry relative to a radial plane extending through the slit. The securing ring may have an oval or elliptical form as viewed in the axial direction. Alternatively or additionally, it is also possible to bend the ends of the securing ring adjoining the slit radially inwardly, or to double them over. This holds the securing ring in the groove of the shaft under high tension, at least approximately centered in the groove of the shaft. In this way, damage to the securing ring and/or the groove upon introduction of the shaft into the sleeve is prevented.

According to a further preferred embodiment of the invention, the securing ring has a wave-shaped, bent and/or zig-zag profile. In this way, axial play of the securing ring within one of the grooves can be corrected.

The invention also concerns a connecting arrangement comprising a first component which has, at least partially, an essentially cylindrical external surface, and a second component which has, at least partially, an essentially cylindrical internal surface for accommodating the cylindrical external surface of the first component, and a securing ring of the aforementioned type, which, in order to connect the two components, can be introduced into grooves associated with one another and arranged in the external surface and the internal surface.

In order to connect the two components with a defined force or release the two components from one another with a defined force, it is preferable if at least one of the associated grooves also has a defined bevel and/or a rounding at the transition to the external surface or the internal surface. Preferably, the at least one bevel of the securing ring and the at least one bevel of the grooves are adapted to one another such that the bevels come into contact with one another upon axial movement of the two components. This means that, in the event of a further relative axial movement, the bevels slide over one another so that the securing ring is thereby forced radially inwardly or radially outwardly.

If the two components are connected to one another pre-assembled as described above, it is preferred that the first and/or the second component has at least one guide bevel adjoining the internal or external surface. This minimizes the danger of damaging the securing ring and/or the grooves and the sealing ring during assembly.

According to one particularly preferred embodiment of the invention, the first component is a shaft or a journal in the drive train of a vehicle and the second component is an internal drive hub of a ball-and-socket joint, said drive hub being provided with a central opening. Shaft arrangements of this type are provided, for example, in longitudinal shafts or axle shafts of motor vehicles for transmitting torque from a power unit to the driven wheels. Due to the above described disadvantages of conventional securing rings, it has heretofore been difficult to connect a journal to an internal drive hub of a ball-and-socket joint with a securing ring. For that reason, a shaft nut has often been used to connect a journal to the internal drive hub of a ball-and-socket joint. By contrast, the connecting arrangement according to the invention has the advantages of low weight and a smaller structural space requirement.

The angle of inclination of the at least one defined bevel is preferably selected so that the force required to release the connection is greater than the maximum axial force which can be transmitted in the drive train as a result of friction and/or inertia. In a drive train, sliding joints, sliding arrangements and/or elastic elements are usually provided between two mounting points and these permit a certain degree of axial play or a defined displacement movement in the drive train. The maximum axial force that can be transmitted in the drive train is essentially influenced by the friction of such sliding elements and their inertia. According to the invention, the angle of inclination of the at least one bevel is selected so that the maximum axial forces acting on the drive train during operation can be transmitted by the connecting arrangement. Only when a pre-determinable axial load of greater magnitude is applied, is the connecting arrangement non-destructively released.

Preferably, the first and second components are matched to the securing ring such that the connection fails in defined manner when an axial force of less than 50 kN acts on the drive train. This prevents excessively high axial forces from building up in the drive train in the event of an accident, which could result in undefined buckling of the shaft.

In one embodiment of the inventive concept, it is preferable if the first and second components are matched to one another and to the securing ring such that following defined failure of the connection, with an axial force of less than 5 kN acting on the drive train, the first and second components can be pushed together in telescopic manner. Aside from providing defined guidance of the two components in one another, this also reliably prevents buckling of the shaft.

A jointed shaft according to the invention in a drive train of a vehicle comprises at least one connecting arrangement of the aforementioned type, wherein the first component is a shaft or a journal in the drive train and the second component is an internal drive hub of a ball-and-socket joint provided with a central opening. The first and second components are matched to one another such that upon failure of the connecting arrangement, the jointed shaft is telescopically collapsible by at least 250 mm, in particular 300 mm. This large displacement travel prevents buckling of the jointed shaft in the event of an accident.

The jointed shaft is usually equipped with at least two of the above mentioned connecting arrangements, wherein the respective first and second components of the connecting arrangements are matched to one another such that, in the event of a failure of the connecting arrangements, the jointed shaft is telescopically collapsible by at least 250 mm, in particular 300 mm. The displacement travel of each connecting arrangement can therefore be significantly less than 250 mm.

The underlying problem on which the invention is based is also solved, independently of the above described features, in that the first component can be inserted into the second component and is sealable with at least one sealing ring, wherein at least one sealing ring is arranged behind the securing ring in the inserting direction. In other words, in the assembled condition of the connecting arrangement, the securing ring is positioned at a greater axial distance from the front end of the second component approaching the first component during insertion than the sealing ring. If the first component is a journal or the like which can be inserted into a sleeve or internal drive hub of a joint, the securing ring is consequently arranged closer to the front end of the journal than the sealing ring.

In this way, it is possible also to seal the securing ring so that dirt can be excluded by the securing ring from the connecting region of the two components, and later disassembly of the connecting arrangement is made substantially easier. A further advantage of this arrangement according to the invention is that the sealing ring need only be displaced by a minimal distance during insertion of the first component into the second component, thus significantly reducing the risk of damaging the sealing ring. A particular advantage of this arrangement is that the sealing ring does not need to fit into the groove in the first or second component into which the securing ring is able to lock. This prevents damage to the sealing ring on passing the edges of this groove.

In another embodiment of the inventive concept, the sealing ring is arranged in a non-profiled section of the first and/or second element, for example, a groove. The first and second elements are provided at least partially with corresponding profiling, for example, spline toothing, in order to transmit a torque. In order to improve the sealing effect of the sealing ring and to prevent damage to the sealing ring, it is preferable if the sealing ring is provided in a groove of the first component (journal), wherein the groove is arranged in a section of the first component that is not provided with such profiling serving for torque transmission. In other words, the section in which the sealing ring is arranged has an essentially cylindrical configuration with the exception of the groove for the sealing ring. In the same way, the corresponding internal surface of the second component (internal drive hub/sleeve) is provided with an essentially cylindrical internal section against which the sealing ring lies.

When the connecting arrangement is In the assembled state, the sealing ring preferably lies close to one end of the, for example, sleeve-shaped second component. The securing ring can also be provided close to this end, but displaced further into the second component than the sealing ring. The securing ring can either be held in a groove of the first component (journal) and lock into place in a corresponding groove in the second component, or conversely, it can be held in a groove in the second component and lock into place in a corresponding groove in the first component during assembly.

BRIEF DESCRIPTION OF THE DRAWINGS

The invention will now be described in greater detail with reference to illustrative embodiments shown in the accompanying drawing figures. All the features described and/or illustrated constitute the subject matter of the invention either alone or in any combination, regardless of their bringing together in the claims or their reference to other claims. In the drawings:

DETAILED DESCRIPTION OF PREFERRED EMBODIMENTS

Figure 1:
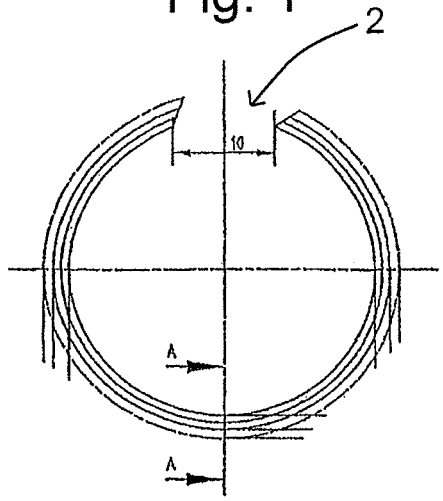
FIG. 1 is a side view of a securing ring according to a first embodiment of the invention.
Figure 2:
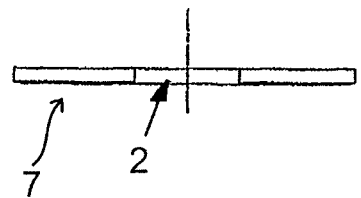
FIG. 2 is a plan view of the securing ring of FIG. 1.
Figure 3:
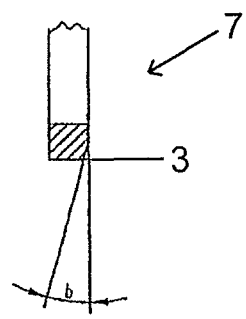
FIG. 3 is a section through the profile of the securing ring of FIG. 1.

The securing ring 1 shown in FIGS. 1 to 3 has an essentially round form as viewed in the axial direction, with a slit 2 which permits radial expansion or compression of the securing ring 1. As FIG. 3 shows, the securing ring 1 has an essentially rectangular profile in cross-section. In the embodiment according to FIG. 3, a bevel 3 is provided on one of the radially outer edges of the securing ring 1, said bevel being inclined at an angle of approximately 15° relative to the radially extending side surface of the securing ring 1. In order to connect two components and to release this connection, the securing ring 1 must be sufficiently elastic and, for this purpose, can be made from spring steel.

Figure 4:
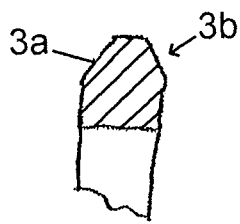
FIG. 4 is a section through the profile of the securing ring according to a second embodiment of the invention.
Figure 5:
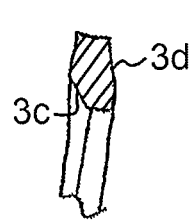
FIG. 5 is a section through the profile of a securing ring according to a third embodiment of the invention.

FIGS. 4 and 5 show two further embodiments of a securing ring. In the embodiment according to FIG. 4, both of the radially outer edges of the securing ring are provided with defined bevels 3a and 3b. In the embodiment according to FIG. 5, however, a radially outer edge and a radially inner edge of the securing ring are each provided with a bevel 3c and 3d, respectively.

Figure 6:
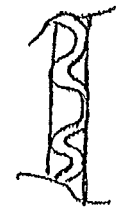
FIG. 6 is a plan view of a securing ring according to a fourth embodiment of the invention.

As shown in FIG. 2, in plan view, the securing ring 1 has the form of a planar disk. However, in the embodiment according to FIG. 6, the securing ring is provided with a wave-shaped profile so that the securing ring can also compensate for axial play.

Figure 7:
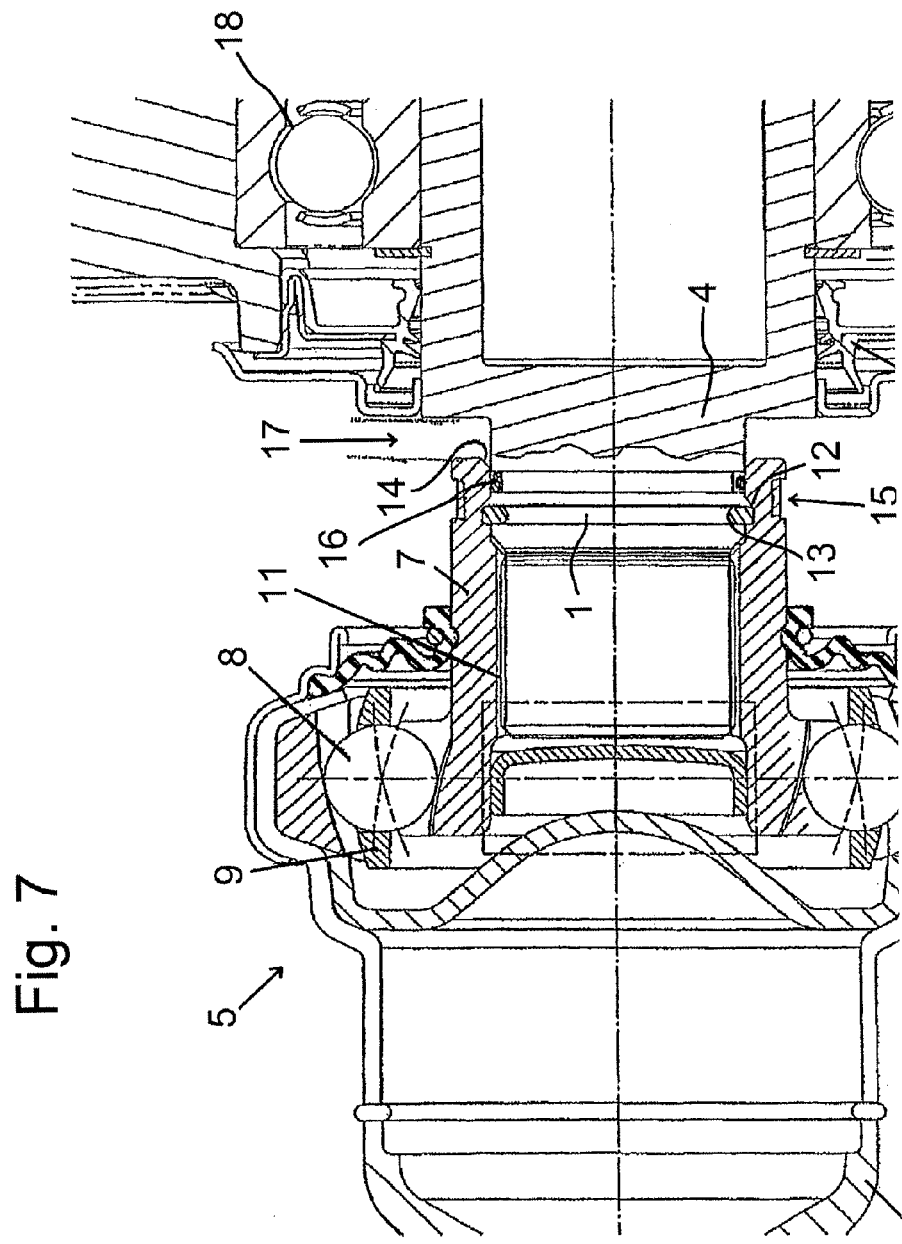
FIG. 7 is a connecting arrangement according to the invention.

FIG. 7 shows a connecting arrangement according to the invention in which a gearbox-side journal 4 is connected via a securing ring 1 to a ball-and-socket joint 5. The ball-and-socket joint has an external drive hub 6 with a plurality of raceways configured as opposing tracks and an internal drive hub 7, which is also provided with raceways configured as opposing tracks. Balls 8 which are guided in a cage 9 are accommodated in each of the raceway pairs of the external drive hub 6 and the internal drive hub 7, said raceways being associated with one another in pairs. By this means, a torque can be transmitted from the internal drive hub 7 to the external drive hub 6 and to a hollow shaft 10 connected to the latter.

In order to transmit torque between the internal drive hub 7 and the journal 4, spline toothing 11 can be provided internally on the internal drive hub 7 and externally on the journal 4. The journal 4 can thus be inserted in twist-proof manner into the internal drive hub 7 and needs only to be fixed axially via the securing ring 1.

Provided both in the internal drive hub 7 and on the journal 4 are grooves 12 and 13 which are associated with one another. A securing ring 1 of the above mentioned type can be introduced into the groove 13 of the journal 4 and, in the unloaded condition, said securing ring projects out of the groove 13 at least partially. To axially connect the journal 4 to the internal drive hub 7, the journal 4 is inserted into the internal drive hub 7, whereby the securing ring 1 is forced into the groove 13 by a guide bevel 14 on the end face of the internal drive hub 7. As soon as the grooves 12 and 13 are arranged in the mutually associated positions thereof shown in FIG. 7, the securing ring 1 snaps into the groove 12 of the internal drive hub 7, undergoing radial expansion due to its pretension. This creates the connection between the internal drive hub 7 and the journal 4.

An assembly groove 15 which enables the engagement of a tool for pushing together the internal drive hub 7 and the journal 4 can be provided on the outside of the internal drive hub 7. A further groove to accommodate a sealing ring 16 can also be provided on the journal 4.

In order to release the connection between the journal 4 and the internal drive hub 7, a tool can be introduced into the disassembly gap 17 between the end side of the internal drive hub and a shoulder of the journal 4, so that the internal drive hub 7 can be pushed off the journal 4. Herein, an edge of the groove 12 of the internal drive hub 7 comes into contact with the bevel 3 of the securing ring 1. The edge of the groove 12 slides over the bevel 3 of the securing ring 1 and forces said ring radially inwardly into the groove 13 so that the internal drive hub 7 can be pulled off the shaft.

The assembly and/or disassembly of the connection between the journal 4 and the internal drive hub 7 can also be performed by using a jaw-shaped tool which can be inserted into the assembly groove 15 and/or into the disassembly gap 17. This tool (not shown in the drawings) can be provided with a rod on which a weight is slideably mounted. The rod is also provided with a stop surface against which the weight can impact, so that an impulse is transmitted by the rod to the jaw-like tool, which thus pushes the internal drive hub 7 onto, or pulls the internal drive hub 7 off, the journal 4.

The connecting arrangement shown in FIG. 7 is not only lighter and more compact than conventional connecting arrangements with a shaft nut, but also enables the journal 4 to be kept small. Advantageously, bearings 18 and shaft sealing rings 19 of relatively small diameter can therefore be used.

As shown in FIG. 7, the connecting arrangement according to a preferred embodiment of the invention is configured so that the journal 4 has a section (on the left in FIG. 7) situated at the front in the inserting direction, which is provided with the profiling 11 (spline toothing), and a section (on the right in FIG. 7), which has an essentially cylindrical configuration, with the exception of the grooves for accommodating the securing ring and the sealing ring 16. The sleeve-shaped internal drive hub 7 has a corresponding section with an internal toothing and an essentially cylindrical internal section situated close to the right front-side end in FIG. 7, in which the groove 12 for accommodating the securing ring is provided.

The sealing ring 16 lies further outwardly, that is, nearer to the end of the internal drive hub 7 (on the right in FIG. 7) than the securing ring. During assembly, therefore, the securing ring 16 does not have to pass any profiled section 11 of the internal drive hub 7 and does not have to be pushed over any groove 12 for the securing ring. Together with the stop for the sealing ring on the cylindrical internal surface of the internal drive hub 7, this not only enables good sealing, but also prevents damage to the sealing ring. The sealing ring can thus be effectively sealed against dirt which could penetrate, for example, via the disassembly gap 17.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A jointed shaft in a drive train of a vehicle, comprising a shaft or a journal in the drive train as a first component and a ball-and-socket joint, wherein the ball-and-socket joint comprises an internal drive hub as a second component, wherein the first component and the second component are fixed relative to one another by a securing ring, wherein said drive hub being provided with a central opening, the securing ring is made from an elastic material, and is provided with a radially extending slit, and comprises a profile having a substantially rectangular cross-section, both radially outer edges of said cross-section are provided with one defined bevel for facilitating assembly or disassembly of the securing ring, said first component has, at least partially, an essentially cylindrical external surface having spline toothing, and said second component has, at least partially, an essentially cylindrical internal surface having a mating splined toothing for accommodating the cylindrical external surface of the first component, and the securing ring is configured to be introduced into grooves associated with one another and arranged in said external surface and said internal surface in order to connect the two components, said first component is configured to be inserted into the second component and sealed with at least one sealing ring arranged behind said securing ring in the direction of insertion, said sealing ring is arranged in a groove of a non-splined toothing of the first component to seal against the internal surface of the second component, at least one of said two defined bevels provided on said radially outer edges of said cross-section is inclined at an angle of between approximately 15° and approximately 35° relative to a radial side surface of said securing ring, at least one of the grooves associated with one another has a defined bevel at a transition to the external surface or the internal surface, the two defined bevels provided on said radially outer edges of said cross-section and the at least one defined bevel of the grooves associated with one another are adapted to one another such that upon on axial movement of the two components relative to one another, one of said two defined bevels provided on said radially outer edges of said cross-section and the at least one defined bevel of the grooves associated with one another come into contact with one another and slide over one another, thereby forcing said securing ring radially inwardly or radially outwardly, and at least one of the first component and the second component has at least one guide bevel at a distal end of the first or second component adjoining the respective internal or external cylindrical surface for alignment and insertion of the shaft into the hub.

2. The jointed shaft as claimed in claim 1, wherein the two defined bevels provided on said radially outer edges of said securing ring are inclined at different angles relative to said radial side face of the securing ring.

* * * * *